Oct. 13, 1970  E. MAJOR  3,533,659
SAFETY BELT ASSEMBLY WITH INERTIA OPERATED HOLDING DEVICE
Filed Jan. 31, 1969  6 Sheets-Sheet 1
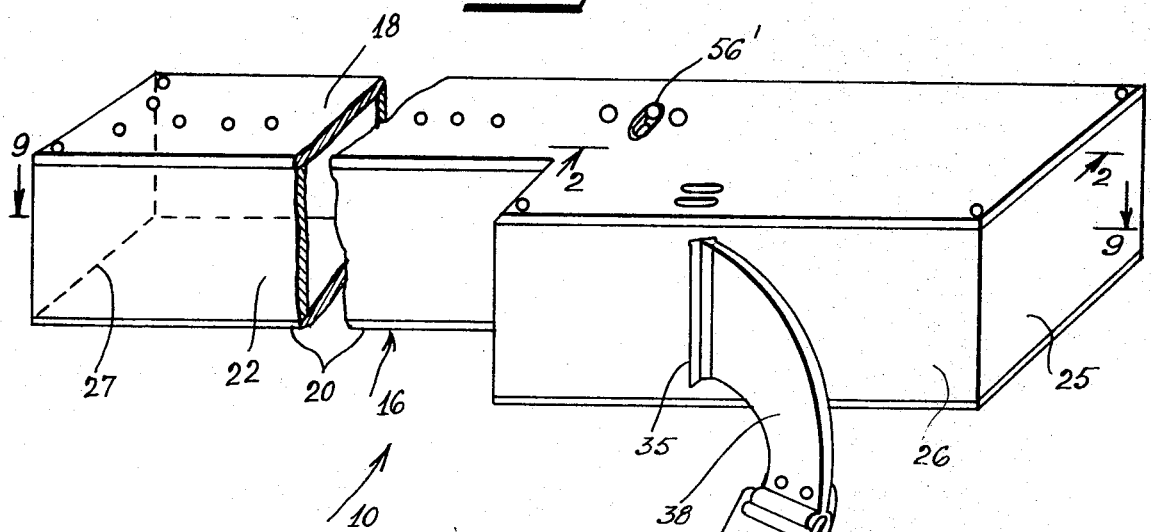
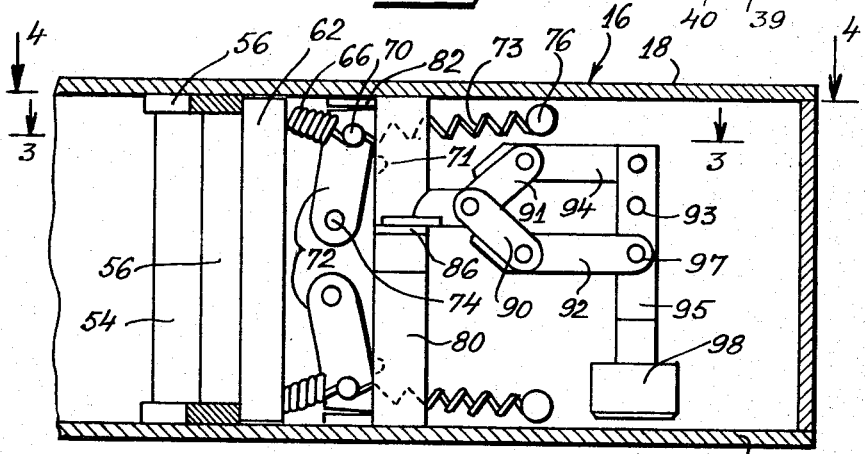
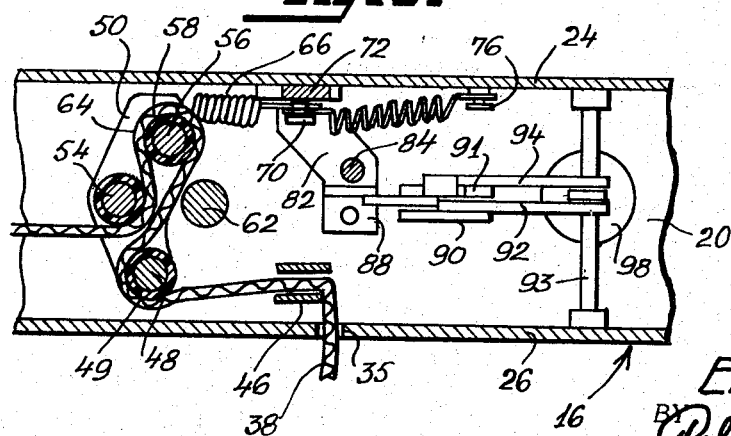
INVENTOR.
Emery Major
BY Polachek & Saulsbury
ATTORNEYS

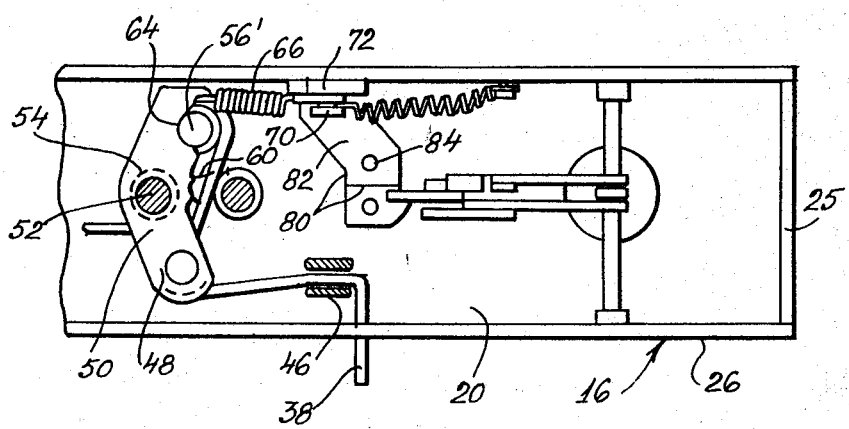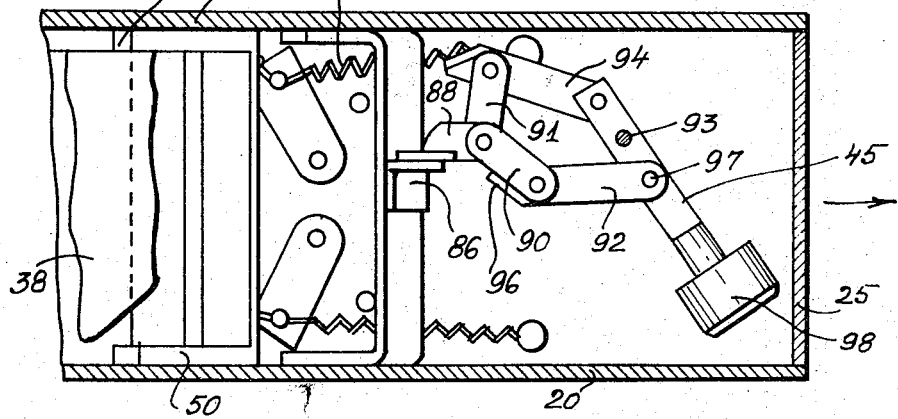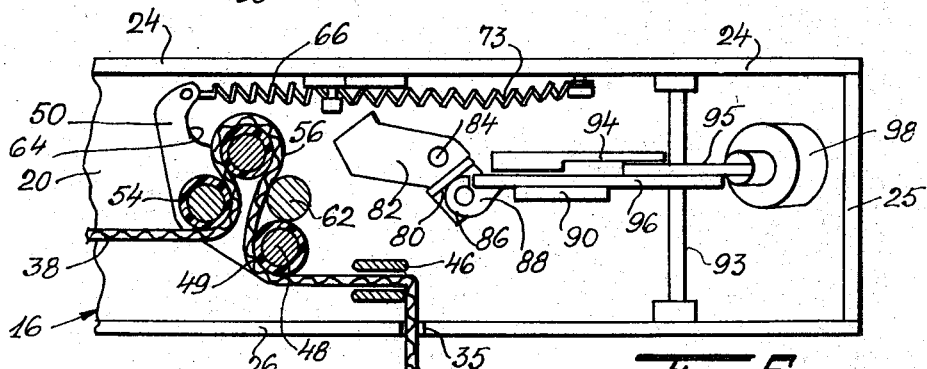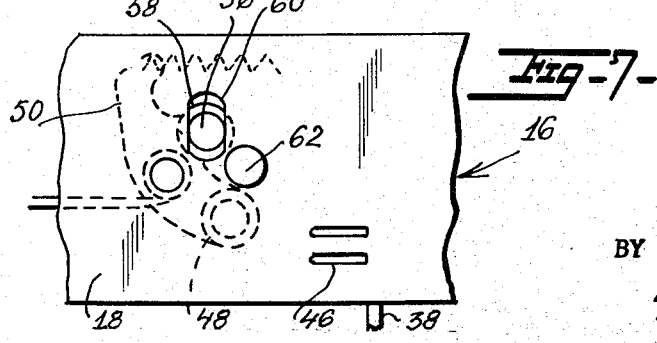

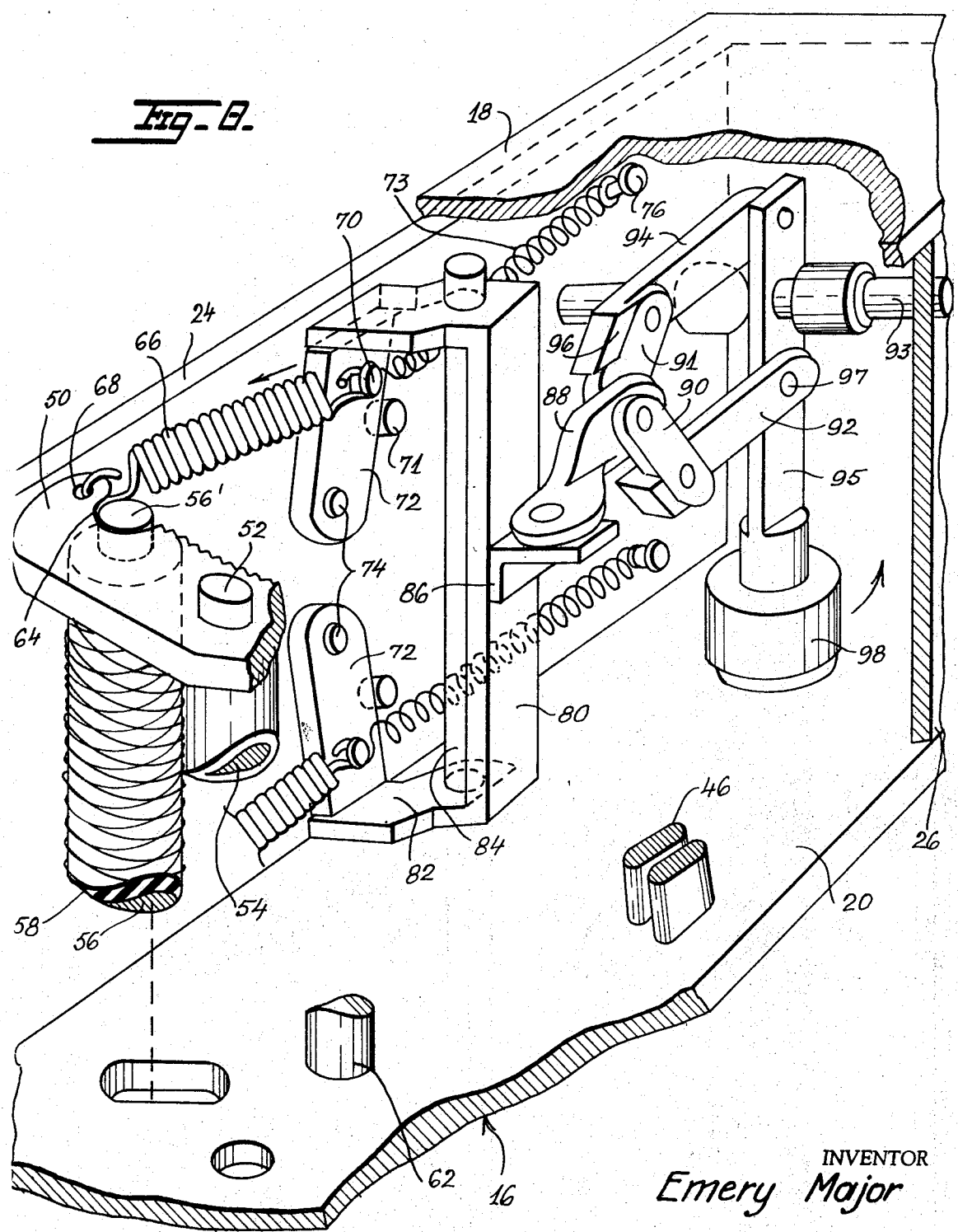

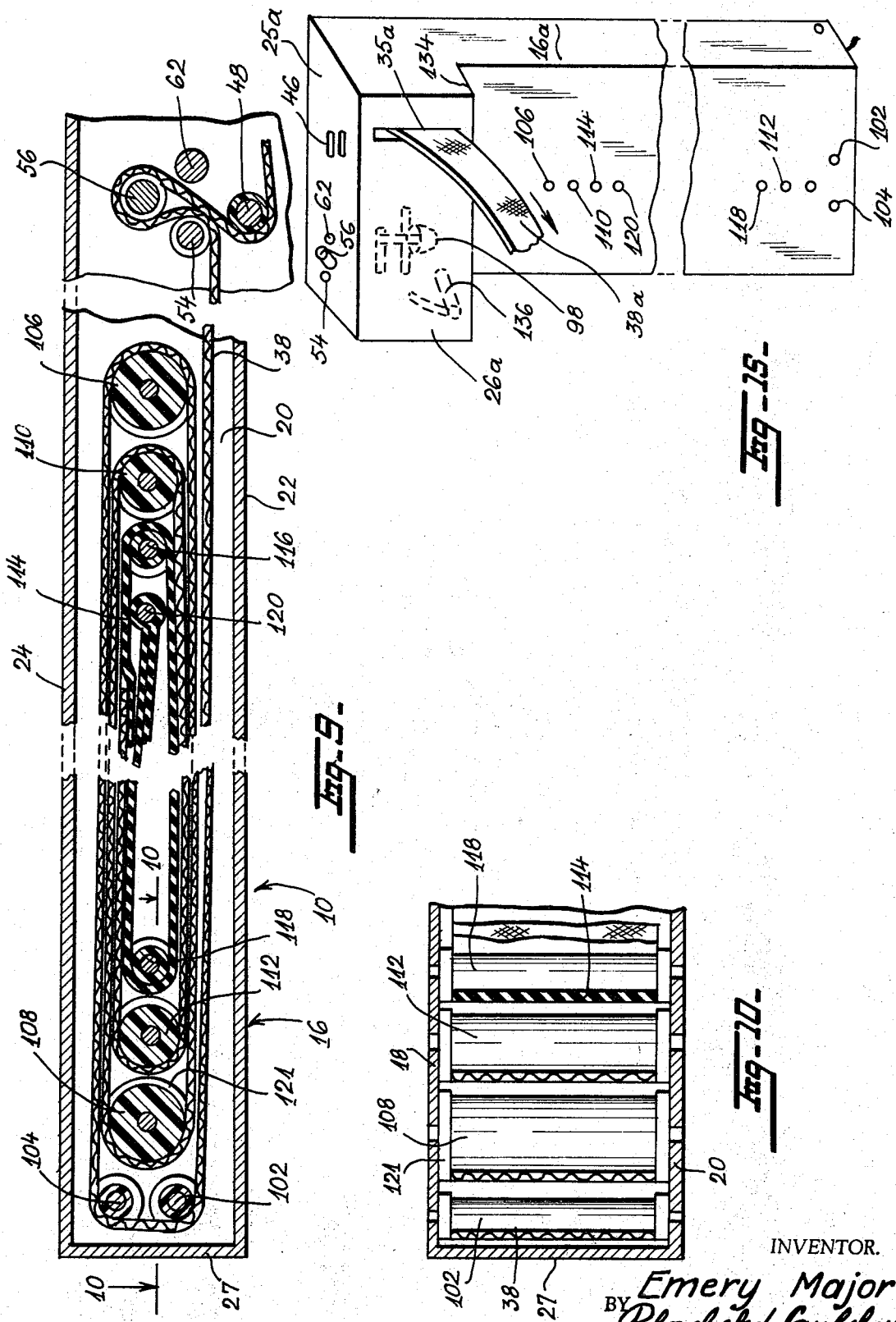

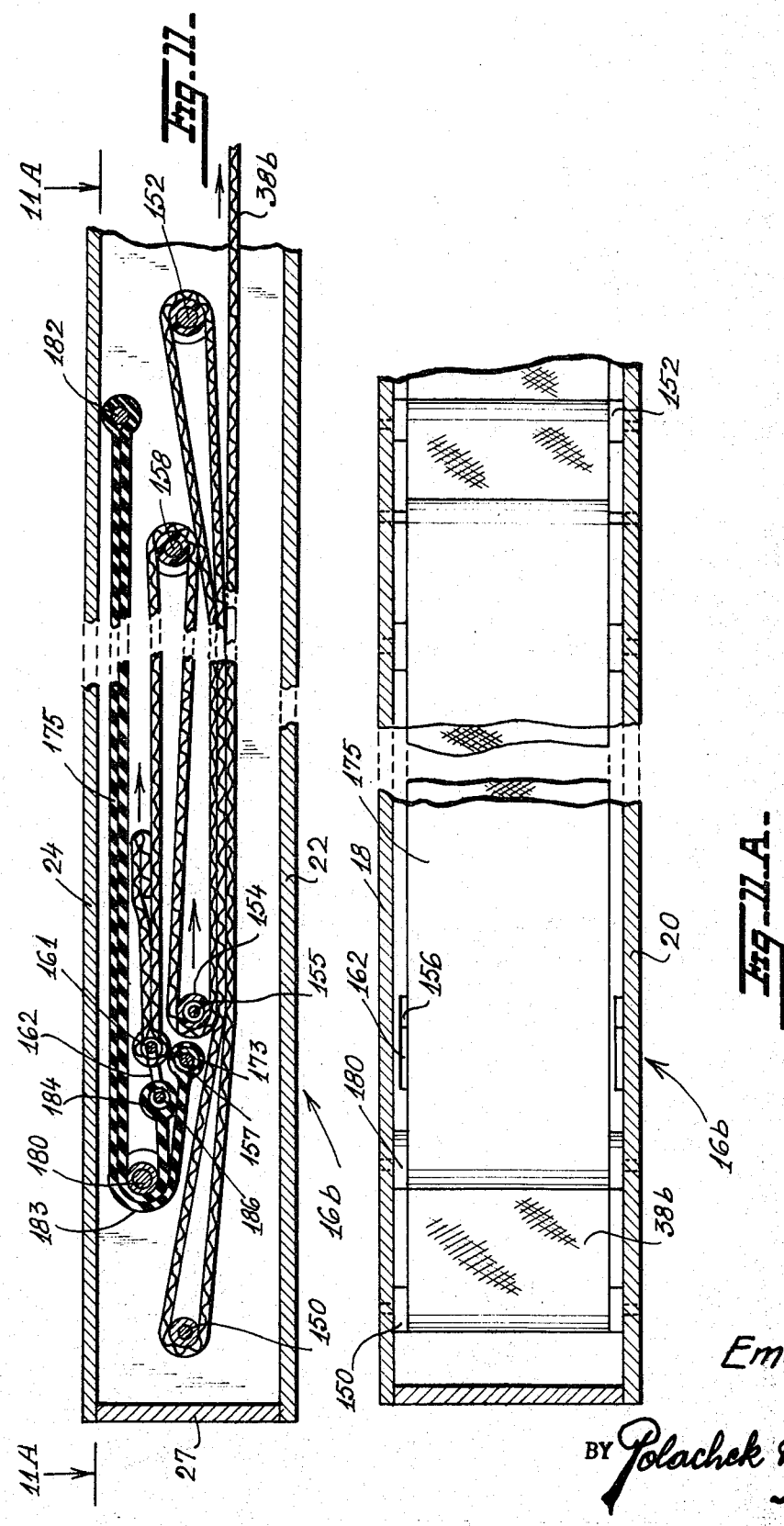

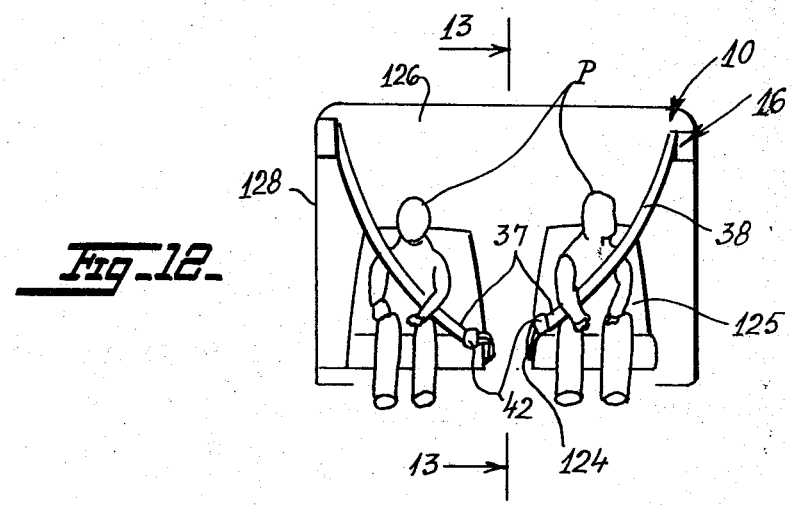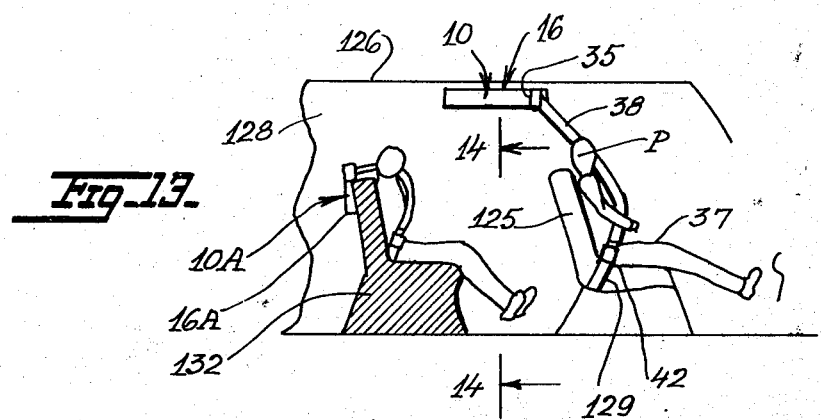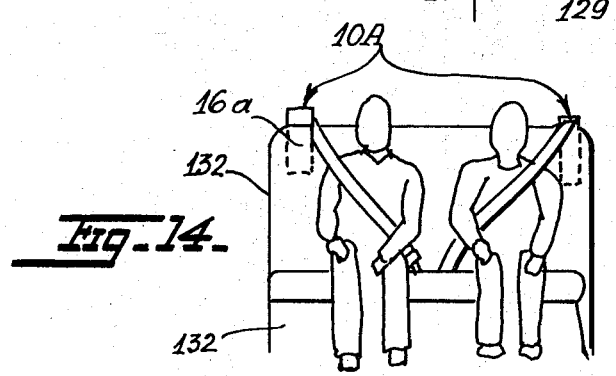

United States Patent Office 3,533,659
Patented Oct. 13, 1970

3,533,659
SAFETY BELT ASSEMBLY WITH INERTIA
OPERATED HOLDING DEVICE
Emory Major, Tiburon, Calif.
(38 Grande Paseo, San Rafael, Calif. 94903)
Filed Jan. 31, 1969, Ser. No. 795,622
Int. Cl. A62b 35/00
U.S. Cl. 297—389                                    9 Claims

ABSTRACT OF THE DISCLOSURE

An inelastic belt is connected to an elastic belt and both are entrained around rollers in a long casing adapted to be mounted in a vehicle. The inelastic belt is drawn out of the casing and retracted in the casing via a mechanism which grips the inelastic belt upon application of excessive tension to a portion of the belt outside the casing. A pendulum is connected to a linkage which actuates the mechanism for gripping the inelastic belt when the vehicle is rapidly decelerated and excessive tension is simultaneously applied to the portion of the belt outside the casing.

---

This invention relates to the art of safety harnesses for travelers in vehicles.

Safety harnesses and belts heretofore known have employed spring loaded belts to effect retraction. These belts are generally mounted at the seat of a passenger in a vehicle. Difficulty has been encountered with such belts because the springs tend to become inoperative when jammed between a closing door and the body of the vehicle. Also, the springs tend to become inoperative due to wear and fatigue. A common difficulty encountered with safety belts and harnesses of the type which extend diagonally across the body of a passenger is that they limit body movements of the passenger excessively. Furthermore, when not in use they hang loosely in the vehicle in a very dangerous manner. Whe wound up in reels they are too bulky. It has been proposed heretofore to provide retracting seat belts with inertia operated reels. The purpose being to permit freedom of movement of passengers except when a collision is imminent or has occurred at which time the inertia mechanism of the reel prevents unreeling of the belt or harness. U.S. Pats. 3,203,641 and 3,323,831 are typical of such constructions. These prior devices will involve spring loaded reels and include small swinging weights to actuate cams or ratchets.

In the present invention the use of reels, spring loaded belts is avoided in an assembly which is especially adapted for use over the shoulder harnesses or belts.

Various objects, features and advantages of the invention will become apparent upon reading the following specification together with the accompanying drawing forming a part thereof.

Referring to the drawing:

FIG. 1 is a perspective view of a safety belt assembly embodying the invention, part being shown broken away.

FIG. 2 is an enlarged fragmentary vertical sectional view taken on line 2—2 of FIG. 1 but with belt omitted to show construction and arrangement of parts of an inertia operated mechanism shown disposed in normal operating position.

FIG. 3 and FIG. 4 are horizontal sectional views taken on lines 3—3 and 4—4 respectively of FIG. 2.

FIG. 5 is a vertical sectional view similar to FIG. 2 showing the inertia operated mechanism in actuated position for locking the belt against outward movement.

FIG. 6 is a view similiar to FIG. 3 taken on line 6—6 of FIG. 5 showing the inertia operated mechanism in actuated position.

FIG. 7 is a fragmentary horizontal plan view taken on line 7—7 of FIG. 5.

FIG. 8 is a further enlarged fragmentary perspective view of part of the assembly portions being omitted or broken away, the inertia operated mechanism being shown in the same operating position as in FIGS. 2, 3 and 4.

FIG. 9 is an enlarged fragmentary horizontal sectional view taken on line 9—9 of FIG. 1, parts being omitted.

FIG. 10 is a fragmentary vertical sectional view taken on line 10—10 of FIG. 9.

FIG. 11 is a sectional view similar to FIG. 9 showing another construction according to the invention.

FIG. 11A is a vertical sectional view taken on line 11A—11A of FIG. 11.

FIG. 12 is a diagrammatic view of the front seat of an automotive vehicle provided with safety harness assemblies according to the invention.

FIG. 13 is a diagrammatic vertical sectional view showing both front and rear seats of the vehicles equipped with safety harness assemblies.

FIG. 14 is a diagrammatic front view of the rear seat of the vehicle taken on line 14—14 of FIG. 13.

FIG. 15 is an enlarged perspective view with parts broken away showing a safety harness assembly as employed on the rear seat of the vehicle.

Referring first to FIG. 1, there is shown a safety harness assembly 10 having an elongated generally rectangular casing 16 with flat upper and lower walls 18, 20, vertical side walls 22, 24, front end wall 25 and rear end wall 27. As viewed in FIG. 1, the casing has a laterally extending section with side wall 26 offset laterally of side wall 22. The front end portion of the casing is thus wider in plan view than the rear end portion. In side wall 26 is a narrow vertical opening 35 through which one end of an inelastic fabric belt or harness 38 extends. This end of the belt terminates in a buckle 37 having a slot 39 and tongue 40. This buckle is adapted for engagement by a quick detachable conventional safety catch 42 indicated diagrammatically in FIGS. 12 and 13.

FIGS. 2–8 show to best advantage the arrangement of the inertia operated mechanism for gripping the belt to prevent withdrawal of the belt from the casing in the event of an emergency. It will be noted in FIGS. 3 and 6 that two closely spaced flat posts 46 are located at opening 35. The posts define a narrow passage through which the belt passes. The belt extends around a vertical roller 48 having a rubber or plastic jacket 49. Roller 48 is mounted between a pair of flat horizontal bell crank levers 50. The levers pivot near their centers on pins 52 at ends of another vertical roller 54. Belt 38 extends from roller 48 and passes around a vertical third roller 56 having a cylindrical jacket 58. This roller has opposite ends 56' slidably engaged in slots 60 in the upper and lower walls 18, 20 of the casing. A stationary non-rotatable post 62 is disposed slightly forward of both rollers 48 and 56 and is secured by welding or otherwise to the upper and lower walls of the casing. The belt 38 extends around roller 56 and then around roller 54 as clearly shown in FIGS. 3 and 6.

Levers 50 have cutouts or recesses 64 formed near their ends at their forward edges. Roller 56 normally receives and engages the levers at recesses 64 as shown in FIGS. 3 and 4. Roller 56 is then located at ends of slots 60 near wall 24. The levers are held in engagement with roller 56 by coil springs 66 engaged between holes 68 in ends of the levers and pins 70 carried by pivotable arms 72. Arms 72 turn in a vertical plane at wall 24 of the casing. They are carried by pivot pins 74. Stop pins 71 engage forward edges of arms 72. Further springs 73 are engaged between pins 70 and stationary pins 76 mounted on wall 24.

Arms 72 are prevented from turning or moving rearwardly to the left as viewed in FIGS. 2 and 3 by a rectangularly U-shaped catch bar 80. The flat fingers 82 of the bar engage arms 72. A shaft 84 extends through the fingers 82 and ends of the shaft are engaged in upper and lower walls 18, 20 (see FIG. 8). The bar 80 is thus turnable angularly around a vertical axis defined by shaft 84. A bracket 86 extends horizontally outward of the center of bar 80. The bracket carries a link 88 to which is pivotally attached a pair of links 90, 91. The latter links are pivotally secured to link arms 92, 94. These arms have flat flanges or fingers 96 which stop pivotal movement of links 90, 91 in one direction with respect to each associated link arm 92, 94. Link arms 92, 94 are connected by pins 97 to shaft 95 of a free swinging weight or pendulum 98. Shaft 95 swings in a vertical plane on a horizontal shaft 93 extending between side walls 26 and 24, as clearly shown in FIGS. 3 and 8. Shaft 95 assumes a vertical position as shown in FIGS. 2 and 8 during normal operation of the mechanism when belt 38 is being drawn slowly out of the casing or being slowly retracted into the casing. FIGS. 5 and 6 show that the weight 98 can be swung forwardly toward the right or forward end of the casing in the event that the vehicle in which the assembly is mounted is suddenly decelerated or stopped.

When weight 98 swings forwardly, bar 80 turns counterclockwise as viewed in FIG. 6. This disengages fingers 82 from arms 72 and permits these arms to turn rearwardly of the casing toward levers 50. At the same time roller 56 is moved laterally inward from the position shown in FIG. 3 toward side wall 22 due to the tension on belt 38. This jams the belt between roller 56 on one side and both roller 54 and post 62 on the other side. Roller 56 moves out of recesses 64 up to post 62. Roller 48 is jammed non-rotatably against post 62. Thus the belt is stopped from moving out of opening 35. When tension on the belt is relieved and the deceleration of the vehicle stops, springs 66 and 73 contract to restore the rollers 48, 54 to the position of FIG. 3. Levers 50 move roller 56 back to its original position adjacent wall 24 and into engagement with the levers at recesses 64. The displaced weight 98 lags behind the contraction of springs and returning of arms 72 so that arms 72 are in the forward position shown in FIG. 2 when bar 80 is returned to its original position to hold the arms 72 against rotation rearwardly.

FIGS. 9 and 10 show the elastic means which tensions belt 38. Belt 38 extends from roller 54 rearwardly around two small idler rollers 102, 104 at the rear end 27 of the casing 16. The belt extends forwardly around a third large roller 106 located just to the rear of roller 54. From forward roller 106 the belt extends to the rear around a large fourth roller 108 located just forwardly of idler rollers 102, 104. The belt extends forwardly to and around a fifth roller 110 smaller than roller 106, than the belt extends rearwardly around a sixth roller 112 smaller than roller 108, then the belt extends forwardly and is joined to one end of an elastic belt 114 which extends around a seventh roller 116 smaller than roller 110 and located just to the rear thereof. The elastic belt then extends rearwardly around an eighth roller 118 located just forwardly of roller 112 and smaller than this roller. The elastic belt then extends forwardly and is secured to a stationary vertical post 120 secured between upper and lower walls 18, 20 of the casing. Flanges 121 on the rollers engage loops of the belts.

The wound arrangement of the belts 38 and 114 makes it possible to provide a belt assembly long enough to extend down across the bodies of passengers P in front of seats 125 of the vehicle as indicated in FIGS. 12 and 13. The casings 16 of two assemblies 10 are mounted at sides of the vehicle above the heads of the passengers. The casings can be secured to the ceiling 126 and/or to the side walls 128 of the vehicle. It will be noted that no reels or springs are employed for winding up the belts or for tensioning the belts. The belt 114 has sufficient elasticity to extend the belt 38 out of the casing, as far as required. When the belt 38 is fully extended then buckle 37 will be engaged with quick release buckle 42 secured at the end of short strap 129 attached to inner sides of seats 125.

FIGS. 13, 14 and 15 show assembly 10A adapted for mounting on the back of rear seat 132 of the vehicle. The longer narrow portion of casing 16a will be disposed in a vertical position. The shorter wider portion will extend over the top of the seat with wall 134 resting on top of seat 132. The rollers and weight of the inertia operated mechanism are vertical such as shown in FIGS. 2–8 except that they are engaged between walls 25a and 134 instead of between walls 18, 20 as in casing 16. Opening 35a in wall 26a is vertical and extends between walls 25a and 134. An additional idler roller or rollers 136 will be provided inside the casing to pass the belt 38a around the rollers 48, 54, 56 which now are axially horizontal instead of vertical as in casing 16. Pendulum 98 swings in a vertical plane.

FIGS. 11 and 11A show an alternative way of elastically supporting belt 38b in a casing 16b. In this arrangement, belt 38b extends around a first roller 150 at the rear end of the casing 16b and then extends forwardly around a second roller 152 just rearward of roller 54. From roller 152 the belt extends rearwardly around a third roller 154 carried by the forward end 155 of a rectangular loop or ring 156. From roller 154 the belt extends forwardly to and around a forward fourth roller 158. The belt then extends rearwardly around the forward end 161 of another rectangular ring or loop 162. The belt is looped around end 161 and is secured by rivets, stitching or otherwise to itself.

An elastic belt 175 has a loop 173 at one end secured to the rear end 157 of ring 156. From ring 156 the elastic belt extends around a roller 180 located rearwardly of ring 156. From roller 180 the belt extends to and is secured to post 182 and then is passed rearwardly around roller 180 inside of loop 183 of the belt. The belt then terminates in a loop 184 on the rear end 186 of ring 162. All the rollers are journaled in side walls of the casing. Post 182 is secured to the side walls.

By the sinuous arrangement of belts 38b and 175 described, opposite end portions of the elastic belt stretch independently in opposite directions extending and retracting the belt 38b.

The belts shown in FIGS. 9 and 11 are each contained in a long narrow rear section of the casing. The belts are arranged in long wound or sinuous paths. By these arrangements very compact constructions can be provided for playing in and out very long belts.

When the assemblies 10 and 10A are mounted for operation in a vehicle, they will so be disposed as indicated in FIGS. 12–14 that the shaft 95 and weight 98 swing forwardly in a verticle plane due to their inertia when the vehicle is suddenly braked. This will cause release of the pivotable arms 72 to permit pivoting of levers 50 so that rollers 56 and 58 both engage post 62 while roller 56 also engages post 54.

In the event that a passenger in a vehicle suddenly exerts a large pulling force on belt 38 or 38a while it is extended across his body, levers 50 will turn clockwise as viewed in FIG. 3 to the position of FIG. 6 while springs 66 expand. Arms 72 will remain stationary. Roller 56 will move out of engagement with recesses 64 and will move laterally to engage post 62 and roller 54, while roller 48 will engage post 62. This will cause locking of the belt to prevent excessive playing out of the belt. When the excessive tension on the belt is relieved, springs 66 will contract as levers 59 pivot oppositely to restore the roller 56 to its original position engaged in recesses 64 with ends of the roller at ends of the slots 60 closest to outer side wall 24 of the casing.

What is claimed is:

1. A safety harness assembly for a passenger in a vehicle, comprising an elongated casing; a plurality of rollers rotatably mounted in the casing; an elastic belt engaged on certain of said rollers; an inelastic belt engaged on others of said rollers and having one end portion coupled to the elastic belt so that the elastic belt expands and contracts when the other end portion of the inelastic belt is drawn out of and is retracted into the casing; and a mechanism in the casing engaged with the inelastic belt for gripping the same against sudden withdrawal from the casing.

2. A safety harness assembly as defined by claim 1, wherein said mechanism comprises a first other roller movable laterally in the casing; a fixed post disposed near said first other roller and axially parallel thereto; a pair of spaced levers; a second other roller pivotally carrying said levers; a third other roller carried by said levers; said inelastic belt having an intermediate portion entrained around the first, second and third other rollers, said levers having recesses releasably engaging said first other roller, whereby the first other roller is released from said recesses and moves laterally to engage said post and said second other roller, while the levers pivot so that the third other roller engages said post so that the entrained belt is gripped and held against sudden withdrawal from the casing upon application of excessive tension to the inelastic belt.

3. A safety harness assembly as defined by claim 2, further comprising spring means to retract the pivoted levers when said excessive tension is released from the inelastic belt.

4. A safety harness assembly as defined by claim 1, further comprising a vertically supported pendulum in the casing; and linkage means connected to said pendulum and arranged to actuate said mechanism for gripping the inelastic belt and preventing sudden withdrawal thereof from the casing when the pendulum is swung in a vertical plane in response to sudden deceleration of said vehicle.

5. A safety harness assembly as defined by claim 3, further comprising pivotable arms engaged with said spring means; a turnable bar arranged to engage said arms so that the levers are held in engagement with said first other roller; a vertically disposed pendulum in the casing; and linkage means connecting the pendulum and turnable bar, whereby the bar turns and the arms are released thereby to permit the levers to pivot so that the inelastic belt is gripped by said other rollers and held against withdrawal from the casing when the pendulum is swung in a vertical plane in response to sudden deceleration of said vehicle.

6. A safety harness assembly as defined by claim 5, further comprising other spring means engaged with said arms to restore the arms to engagement with said bar and to restore the first other roller to engagement with said levers while the pendulum returns to vertical position afer deceleration of the vehicle ceases.

7. A safety harness assembly as defined by claim 1, wherein said casing has a long narrow section containing the first named rollers, the elastic belt and said one end portion of the inelastic belt, and wherein the casing has a shorter wider section containing said mechanism.

8. A safety harness assembly as defined by claim 4, wherein said casing has a long narrow section containing the first named rollers, the elastic belt and said one end portion of the inelastic belt, and wherein the casing has a shorter wider section containing said mechanism, whereby the narrow section of the casing can be mounted at the back of seat for a passenger in the vehicle while the shorter wider section is disposed on top of the seat back.

9. A safety harness assembly as defined by claim 1, wherein opposite ends of the elastic belt are coupled to spaced parts of the inelastic belt.

References Cited
UNITED STATES PATENTS

| | | | |
|---|---|---|---|
| 2,899,146 | 8/1959 | Barecki | 297—389 X |
| 3,077,324 | 2/1963 | Strickland | 297—385 X |
| 3,241,205 | 3/1966 | Genin | 297—385 X |
| 3,431,019 | 3/1969 | Lewis et al. | 297—385 X |

JAMES T. McCALL, Primary Examiner

U.S. Cl. X.R.

280—150; 297—388